(12) United States Patent
Samuels et al.

(10) Patent No.: US 8,269,154 B2
(45) Date of Patent: *Sep. 18, 2012

(54) OVENWARE FOR MICROWAVE OVEN

(75) Inventors: Michael Robert Samuels, Wilmington, DE (US); Marion Glen Waggoner, Landenberg, PA (US); Joel D. Citron, Wilmington, DE (US); Roger Moons, Duffel (BE); Charles J. Molnar, Wilmington, DE (US)

(73) Assignee: Ticona LLC, Florence, KY (US)

( * ) Notice: Subject to any disclaimer, the term of this patent is extended or adjusted under 35 U.S.C. 154(b) by 1166 days.

This patent is subject to a terminal disclaimer.

(21) Appl. No.: 11/438,518

(22) Filed: May 22, 2006

(65) Prior Publication Data

US 2006/0219713 A1 Oct. 5, 2006

Related U.S. Application Data

(63) Continuation of application No. 10/627,939, filed on Jul. 25, 2003.

(60) Provisional application No. 60/424,166, filed on Nov. 6, 2002, provisional application No. 60/398,898, filed on Jul. 26, 2002.

(51) Int. Cl.
*H05B 6/80* (2006.01)
(52) U.S. Cl. .......................... 219/730; 219/729; 426/107
(58) Field of Classification Search .................. 219/730, 219/759, 679, 744, 729, 741, 734, 634; 524/492, 524/494; 99/DIG. 14; 427/294, 336, 350, 427/380; 252/62, 62.51 R, 62.61, 422; 428/215, 428/357, 34.5, 35.7; 525/422; 501/98.5; 521/61; 426/107
See application file for complete search history.

(56) References Cited

U.S. PATENT DOCUMENTS

| | | | |
|---|---|---|---|
| 3,315,308 A | 4/1967 | Wain et al. | |
| 4,266,108 A | 5/1981 | Anderson et al. | |
| 4,362,917 A | 12/1982 | Freedman et al. | |
| 4,425,368 A * | 1/1984 | Watkins | 426/107 |
| 4,454,403 A * | 6/1984 | Teich et al. | 219/729 |
| 4,503,168 A | 3/1985 | Hartsing, Jr. | |
| 4,518,651 A | 5/1985 | Wolfe, Jr. | |
| 4,542,271 A * | 9/1985 | Tanonis et al. | 219/730 |
| 4,585,823 A * | 4/1986 | Saito et al. | 524/456 |
| 4,626,557 A | 12/1986 | Duska et al. | |

(Continued)

FOREIGN PATENT DOCUMENTS

EP 846419 A1 6/1998

(Continued)

OTHER PUBLICATIONS

Y.S. Touloukian, et al., "Thermal Conductivity NonMatallic..", Thermophysical Properties of Matter, IFI/Plenum NY, vol. 2, pp. 298-300, 1970.

(Continued)

*Primary Examiner* — Quang Van
(74) *Attorney, Agent, or Firm* — Dority & Manning, P.A.

(57) ABSTRACT

Ovenware for microwave ovens which contain a composition comprising a susceptor and a thermoplastic or thermoset polymer are improved when the composition also has a thermal conductivity of about 0.7 W/m° K. or more. Heat generated by absorption of microwave radiation by the susceptor is more readily conducted to the food being cooked when the thermal conductivity of the composition is high, particularly when the part containing the susceptor is relatively thick. Also described are designs for various pieces of ovenware containing this composition.

21 Claims, 5 Drawing Sheets

U.S. PATENT DOCUMENTS

| | | | |
|---|---|---|---|
| 4,649,448 A | 3/1987 | Nakajima | |
| 4,728,762 A | 3/1988 | Roth et al. | |
| 4,851,632 A | 7/1989 | Kaliski | |
| 4,933,526 A | 6/1990 | Fisher et al. | |
| 4,959,516 A | 9/1990 | Tighe et al. | |
| 5,021,293 A | 6/1991 | Huang et al. | |
| 5,028,461 A | 7/1991 | Nakamichi | |
| 5,049,714 A | 9/1991 | Beresniewicz et al. | |
| 5,057,659 A | 10/1991 | Schneider et al. | |
| 5,130,342 A * | 7/1992 | McAllister et al. | 521/61 |
| 5,141,985 A | 8/1992 | Asal et al. | |
| 5,268,546 A | 12/1993 | Berg | |
| 5,308,913 A | 5/1994 | Asai et al. | |
| 5,665,819 A | 9/1997 | Tenzer | |
| 5,677,253 A | 10/1997 | Inoue et al. | |
| 6,077,454 A | 6/2000 | Tenzer | |
| 6,146,764 A | 11/2000 | Suokas et al. | |
| 6,641,878 B2 * | 11/2003 | Suzuki et al. | 428/35.7 |
| 6,871,351 B2 | 3/2005 | Yamauchi et al. | |
| 2002/0113066 A1 | 8/2002 | Stark et al. | |
| 2003/0152724 A1 * | 8/2003 | Swoboda et al. | 428/34.2 |
| 2006/0014876 A1 | 1/2006 | Bushelman et al. | |

FOREIGN PATENT DOCUMENTS

WO    WO01/34702 A2    5/2001

OTHER PUBLICATIONS

Olofa, S.A. et al., "Thermal Conductivity of the Ferrites . . . ", Journal of Thermal Analysis, vol. 37, pp. 2277-2284, 1991.
New Products about PXR-724U Dec. 28, 1998.
Tsou, A.H. et al. "Fillers," From the Online Encyclopedia of Polymer Science and Technology, vol. 10, Mar. 15, 2004.
Chapter 3: Japan's Near Term Optical Storage Roadmap Mar. 27, 2005.
Recordable Optical Pick-up Head for Blu-ray Disc [KES-200A].
Victor JVC Optima 73.
Victor JVC Optima 715.
Victor JVC Optima 725.
Silastic—Wikipedia, the free encyclopedia.
Abstract, WO01/34720 A1, Publication May 17, 2001, Fraunhofer-Gesellschaft-Zur Forderung Der Angwandten Forschung E.V.

* cited by examiner

OVENWARE FOR MICROWAVE OVEN

CROSS REFERENCE TO RELATED APPLICATIONS

This application is a continuation of application Ser. No. 10/627,939, filed Jul. 25, 2003, which claims the benefit of priority to U.S. Provisional Application Ser. No. 60/424,166, filed Nov. 6, 2002 and U.S. Provisional Application Ser. No. 60/398,898, Jul. 26, 2002.

FIELD OF THE INVENTION

Compositions that contain polymers that have good high temperature resistance, a susceptor for microwave energy generated by a microwave oven, and that have relatively high thermal conductivity, are useful as ovenware in microwave ovens. Also described are novel structures for such ovenware.

TECHNICAL BACKGROUND

Common cooking containers such as pots, frying pans, and baking tins are commonly fabricated from metal. People have become used to cooking in metal containers, both for the methods of cooking used and the taste and texture of the foods produced. More recently the use of microwave ovens has become popular, and because of the nature of microwaves, metal containers generally can't be used in such ovens.

In the last 20 years or so, as thermoplastic polymers (TPs) having better high temperature resistance have been developed, the use of these polymers for ovenware has been proposed, see for instance U.S. Pat. Nos. 4,626,557, 4,503,168, 4,585,823, 5,308,913, and 5,141,985, and European Patent Application 846,419, all of which are hereby included by reference. Similar items have been made from thermosetting polymers. These polymeric cooking containers can be used in thermal and/or microwave ovens and often can withstand the highest temperatures usually used in these ovens, for example about 290° C. (~550° F.) or more. These containers have several advantages. They can be molded into practically any shape so that may be easily sealed and the contents can be refrigerated or frozen. Also, they are relatively difficult to break, and are relatively low in weight. However, when cooking food in these containers, particularly in a microwave oven, the cooking method (time and/or temperature for example) may have to be varied from the method used for a metal container, or the food will not normally have the same taste and/or texture. For example, bread or a casserole cooked in a plastic container in a microwave oven may not be browned on the outside surface. This is primarily due to the fact that in microwave ovens the heat is relatively uniformly transmitted into the depth of the items being cooked, as opposed to being conducted in from the surface. Also, in a microwave oven there are usually no hot surfaces to impart browning to the item being cooked.

In order to overcome the lack of browning in microwave ovens, as reported in World Patent Application 01/34720, ceramics containing susceptors have been incorporated into ovenware. Often, the susceptor-containing ceramic is in the form of a plate that is part of a ceramic piece of ovenware. This ovenware has the drawbacks of being heavy and brittle. Also, the materials for this ovenware are expensive and hard to form.

In Japanese Patent Application 63-141591 and World Patent Application 01/34702 it has been suggested that polymers resistant to high temperatures, especially liquid crystalline polymers (LCPs), be filled with materials that are susceptors. Materials that have been used include barium titanate and small amounts of carbon fibers. The resulting composition, when formed into ovenware and used in microwave ovens, is said to cause browning of the surfaces of the items being cooked that are in contact with the ovenware. These surfaces are heated because the susceptors in the polymer absorb microwave energy.

The use of various susceptor-containing compositions for use in microwave ovens is known. See for instance U.S. Pat. Nos. 5,021,293, 5,049,714, 4,518,651, 4,851,632 and 4,933,526. In the examples in these patents, the layer containing the susceptor is typically very thin.

SUMMARY OF THE INVENTION

The present invention is directed to a piece of ovenware adapted for use in a microwave oven. The ovenware, or a portion thereof, is fabricated from a composition that comprises a mixture of a thermoplastic polymer having melting point and/or glass transition point of about 250° C. or higher, or a thermoset polymer having a softening point that is about 250° C. or more and a heating-effective amount of a microwave susceptor, with the proviso that the composition has a thermal conductivity of about 0.70 W/m° K. or more when measured through a plane of the composition.

This invention also concerns, a piece of microwaveable ovenware, comprising a composition which comprises a mixture of a thermoplastic polymer whose melting point and/or glass transition point is about 250° C. or more or a thermoset polymer whose softening point is about 250° C. or more, and a heating effective amount of a microwave susceptor, wherein at least part of said composition is in the form of an insert.

This present invention also includes a process for cooking in a microwave oven, comprising contacting an item to be cooked with the compositions described above and exposing the food and the composition to microwave radiation.

DETAILS OF THE INVENTION

Figure 1A:
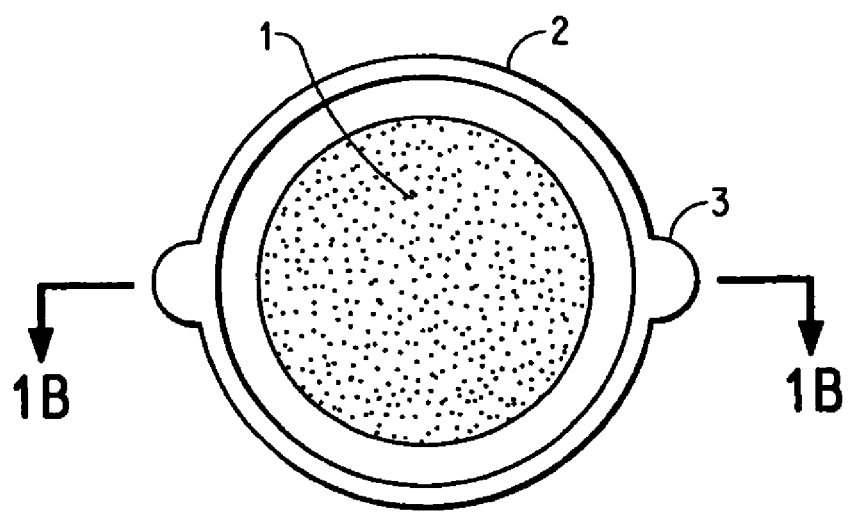
FIGS. 1-6 illustrate various pieces of microwave ovenware containing inserts that contain susceptors and have relatively high thermal conductivity.

As used herein, the following terms shall have the following meanings.

By a "susceptor" or "microwave susceptor" is meant a substance that absorbs microwave radiation (MR) of the frequencies that are used in the microwave ovens. Typically, such frequencies are about 2450 MHz in ovens that are used to cook and/or heat food. Alternatively, the frequency may be 950 MHz or 896 MHz, particularly in commercial microwave ovens. Susceptors may vary in their efficiency in absorbing such MR (see below). When the susceptor absorbs microwave radiation, the energy of the MR is converted to heat.

By "a heating-effective amount of a (microwave) susceptor" is meant an amount such that when an ovenware part containing the susceptor is subjected to MR that part can be heated by the MR such that the food or drink in contact with the part will be heated, preferably cooked, and more preferably browned, seared, or undergo a similar process (collectively herein, browned).

By "ovenware" herein is meant an apparatus that is in contact with the food or drink while it is being cooked and/or heated in an oven, preferably a microwave oven. It may be a "container" such as a bowl, pan (with sides), cylindrical (i.e., the shape of drinking glass), or it may be flat, similar in shape to a flat stone for cooking, for example pizza. In some instances the apparatus may have a cover which may or may not absorb MR. In one preferred form the ovenware is reusable, that is its design and durability are such that it can be reused multiple times, for example much like a metal frying pan can be reused many times. Preferably the cookware is used in a cooking/heating process at least 5 times, more preferably at least 10 times.

By an "insert" herein is meant a part of a larger apparatus that is usually a piece of ovenware and that is different in composition than the remainder of the piece of ovenware. The insert may be permanently attached to the piece of ovenware or may be detachable or not attached at all to the rest of the ovenware part. For example, if the rest of the piece of ovenware is also a composition which contains thermoplastic polymer, a round cooking pan may be formed by first forming a disk of the composition that contains the susceptor, and then overmolding the disk with a second composition that does not contain a susceptor so that the disk forms the bottom interior surface of the pan. The edge of the disk may be beveled to that it is locked in place when the disk is overmolded by the second composition (see FIG. 1). Another example is a round disk of the susceptor-containing material may be molded and simply placed on top of a disk of the second composition, and the food or drink to be cooked placed on top of the disk that contains the susceptor (see FIG. 2). In both instances the parts that contain the susceptor are considered to be inserts.

By a "mixture" herein is meant a mixture of ingredients (polymer, susceptor, filler, for instance) that is mixed, preferably reasonably uniformly. It does not include an item that contains layers of one or more, but not all, of the ingredients.

By "food" herein is meant cooked or uncooked food and/or drink that is desirable to cook and/or heat.

The composition herein that contains the susceptor also contains a thermoplastic (TP) or thermoset polymer (TSP).

TPs can be reformed by melting the thermoplastic and then cooling it below its melting point and/or glass transition temperature. Such polymers are not crosslinked. The TPs have a melting point and/or glass transition temperature above about 250° C., preferably above about 300° C., more preferably above about 340° C., and especially preferably above about 370° C., when measured by differential scanning calorimetry, with the melting point being taken as the peak of the melting endotherm, and the glass transition temperature as the middle of the transition. Such measurements can be done following ASTM method D3418. If the polymer has no melting point (if amorphous) and no glass transition temperature, then its decomposition point shall be used.

The TPs useful in the present invention should preferably have sufficient thermal resistance so that they will not melt when exposed to MR in a microwave oven, when they contain food and/or drink, as they are designed to do. More preferably they should not melt when the ovenware is exposed to MR in a microwave oven and food or drink is not present. Typically such ovens for household use have a maximum output of microwave energy of about 1500 watts.

Useful thermoplastics include polyolefins; polyesters such as poly(ethylene terephthalate) and poly(ethylene 2,6-napthalate); polyamides such as nylon-6,6 and a polyamide derived from hexamethylene diamine and isophthalic acid; polyethers such as poly(phenylene oxides); poly(ether-sulfones); poly(ether-imides); polysulfides such as poly(p-phenylene sulfide); liquid crystalline polymers (LCPs) such as aromatic polyesters, poly(ester-imides), and poly(ester-amides); poly(ether-ether-ketones); poly(ether-ketones); fluoropolymers such as polytetrafluoroethylene, a copolymer of tetrafluoro-ethylene and perfluoro(methyl vinyl ether), and a copolymer of tetrafluoroethylene and hexafluoropropylene; and mixtures and blends thereof.

A preferred type of TP is an LCP. By a "liquid crystalline polymer" is meant a polymer that is anisotropic when tested using the TOT test or any reasonable variation thereof, as described in U.S. Pat. No. 4,118,372, which is hereby included by reference. Useful LCPs include polyesters, poly (ester-amides), and poly(ester-imides). One preferred form of polymer is "all aromatic", that is all of the groups in the polymer main chain are aromatic (except for the linking groups such as ester groups), but side groups which are not aromatic may be present.

TSPs may be used in place of TPs in the susceptor-containing compositions. The TSPs should have a softening temperature of about 250° C. or more, preferably above about 300° C., more preferably above about 340° C., and especially preferably above about 370° C., when measured by ASTM method D648 (Heat Deflection Temperature), Method A, at a load of 1.82 MPa. Useful TSPs include epoxy resins meant for high temperature use, and bis(maleimide)triazines.

TPs are preferred types of polymers for use in the present invention.

The thermal conductivities of virtually all TPs and TSPs, including those types listed above, is generally $<<1$ W/m° K. Because microwaves are absorbed within the depth of the susceptor-containing material, it is possible to have substantial temperature gradients through the thickness of the material. These gradients may be large enough that the interior of the susceptor-containing material melts while the outer surface stays solid. To avoid such situations, the susceptor-containing material should have a thermal conductivity of about 0.7 W/m° K. or more.

The thermal conductivity of the susceptor-containing composition can be raised by mixing the TP or TSP with a particulate material (filler) which itself has a relatively high thermal conductivity, such as about 10 W/m° K. or more, more preferably about 20 W/m° K. or more. Useful fillers are reported below with their approximate thermal conductivity at about 273° K. in parentheses, as reported by Y. S. Touloukian, et al., in *Thermophysical Properties of Matter*, Vol. 2, IFI/Plenum, New York, 1970.) Useful fillers include graphite (including carbon black and carbon fibers) (50-200, varies widely), MgO (60), BeO (200), alumina (45-150), zinc oxide (28), $CaF_2$ (700), and SiC (~100-500). Preferred thermally conductive fillers are graphite, MgO, and alumina, carbon black and carbon fibers. Especially preferred thermally conductive fillers are graphite, carbon black and carbon fibers.

More than one such filler may be used. Generally speaking, the higher the amount of thermally conductive filler used, the higher the thermal conductivity of the TP or TSP composition will be. The upper limit of thermally conductive filler that can be used may be determined more by its effect on the physical strength and toughness of the composition than by the actual thermal conductivity achieved. These thermally conductive fillers, especially those that are not also susceptors, may optionally be added to the susceptor containing compositions to increase the thermal conductivity to the desired level.

Useful susceptors are known in the art. Materials that are useful susceptors include selected inorganic compounds, semiconductors and poor electrical conductors such as carbon and metals. Specific materials include aluminum (powder or dust), carbon (in various forms such as carbon black, graphite powder, and carbon fiber), barium titanate, and metal oxides such as zinc oxide, and iron oxides such as magnetite. In some instances metals may not be a favored form of susceptor.

The concentration of the susceptor in the TP- or TSP-based composition (along with the mass of the composition and the efficiency of the susceptor) will determine what fraction of the MR will be absorbed. The higher the fraction absorbed by the susceptor-containing composition, the less is available to be directly absorbed by the food or drink in any particular cooking situation. The higher the fraction of MR that is absorbed by the susceptor-containing composition, the hotter that composition will get.

One material may serve to function as both a susceptor and thermally conductive filler. For example various forms of carbon are susceptors and have high thermal conductivities. Carbon, for instance in the form of graphite powder, carbon fiber or carbon black is a preferred combined susceptor and thermally conductive filler. Metal in the form of powders or dusts also are susceptors and have high thermal conductivities.

Preferably the filler(s) and susceptors should be relatively small particles. Typically the largest dimension (on average) for a particulate material should be less than about 500 μm, and if fibrous material is used the length(on average) should be less than 1 mm. The fillers and susceptors are preferably uniformly dispersed in the TP or TSP. They may be mixed into the TP using standard melt mixing techniques and equipment, such as single or twin screw extruders. They may be mixed into the TSP before the TSP is crosslinked by standard mixing methods used for uncrosslinked TSPs.

The thermal conductivity of the compositions in some cases must be about 0.7 W/m° K. or more, preferably about 1.0 W/m° K. or more, more preferably about 2.0 W/m° K. or more, very preferably about 3.0 W/m° K. or more, and especially preferably about 5.0 W/m° K. or more. However, inserts which contain susceptors, as described herein, need not have relatively high thermal conductivities in all instances, for example where the insert is relatively thin and or is efficiently cooled in the ovenware of which it is a part. The TP or TSP preferably are present as a continuous phase in the composition. Typically the high thermal conductivity filler (or susceptor if the susceptor also has a high thermal conductivity) is about 5 to about 65% by weight of the composition. The thermal conductivity of the composition is measured through a plane (thinnest cross section) of a test part or piece of ovenware, using ASTM Method D5930.

The thermal conductivity of polymer compositions (not containing substantial amounts of susceptors) previously described for ovenware is typically quite low. For instance, using the same LCP used in Examples 1-4 below, a composition containing 51.6% LCP, 13% of a blue pigment concentrate in the LCP, 35% talc and 0.56% Ultranox® antioxidant (all percentages are by weight of the total composition) was made and molded into a disc. At 100° C. the through the plane of the disc heat conductivity was 0.40 W/m° K.

One important consideration in the design of ovenware containing a susceptor is transferring the heat that is generated by the absorption of the MR by the susceptor to the food being cooked. This is particularly true when the susceptor is contained in a part whose thickness (at least in a portion of the part) is about 50 μm or more, more particularly when the thickness is about 100 μm or more, and very particularly when the thickness is about 200 μm or more. Polymers in general have poor thermal conductivity. If the heat within the susceptor-containing material is not conducted out of that material, its temperature, especially internally, will rise, and heat will not be efficiently transmitted to the food being cooked. This of, course, negates some of the benefits of using a susceptor-containing material. Perhaps just as important, if the temperature of the susceptor-containing material rises to the melting point or glass transition temperature (whichever is higher) of the TP or TSP of the composition, the susceptor-containing material may melt, decompose, or even catch fire, or the food being cooked may be ruined and/or catch fire. The same may be true for a composition that is in contact with the susceptor-containing material, for example the material in contact with the inserts as shown in FIGS. 1 to 6. Therefore, when the susceptor-containing material has thicknesses as described above, it is advantageous that the susceptor-containing composition also have a relatively high thermal conductivity.

Figure 1B:
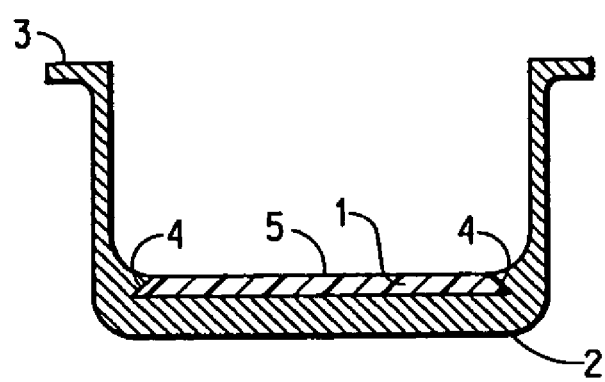

FIGS. 1-6 show various pieces of ovenware constructed according to the present invention. FIG. 1 shows a frying or cooking pan from the top (FIG. 1*a*) and in cross section (FIG. 1*b*). In FIG. 1*a*, 1 is an insert containing a susceptor which has an upper surface 5. 2 is the body of the frying pan that is made of a thermo-plastic composition that has no susceptor and a relatively low thermal conductivity. The body 2 is overmolded over the edge of 1, and both of 3 are (optional) molded-in handles. FIG. 1*b* shows 1, 2, and 3 in cross section, and in particular shows the beveled edge 4 of 1, and how 2 is overmolded over this beveled edge to hold 1 in place. In addition the pan of FIG. 1 may also have feet (not shown, and which may be molded as part of 2) of the composition of 2 to hold the pan above the bottom of the microwave oven, thereby allowing the MR to readily heat the bottom center of 1 by bouncing off a metal bottom of the microwave oven. Because handles 3 are made from a composition not containing a susceptor and have relatively low thermal conductivity, they remain relatively cool through the cooking process, and often allow the pan to be picked up without burning the cook's fingers. The high thermal conductivity of the insert 1 allows heat to flow readily to the upper surface 5 and hence to the food being cooked. This prevents overheating of 1 and/or 2. The pan of FIG. 1 may be used to brown the bottom of food while cooking, as a frying pan (with or without added oil or grease), or may be used much as a pot on a surface cooktop. Most of the comments about the pan of FIG. 1 are applicable to the ovenware shown in the other Figures.

Figure 2A:
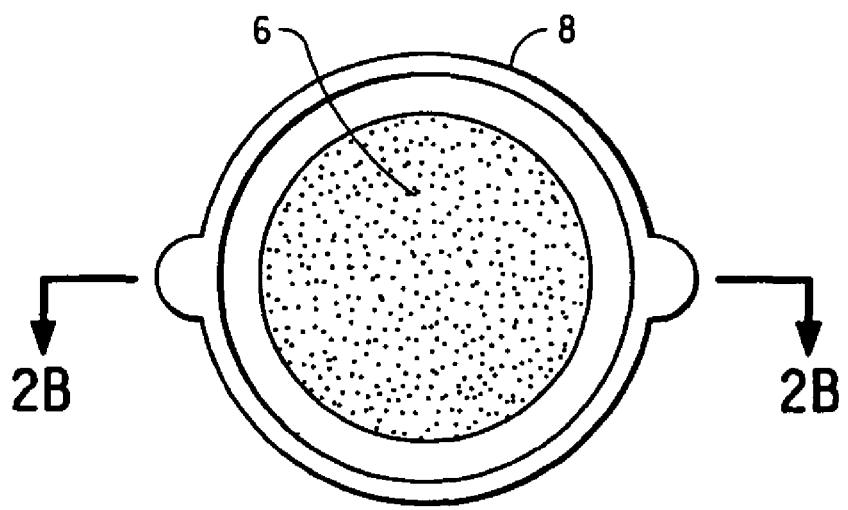
Figure 2B:
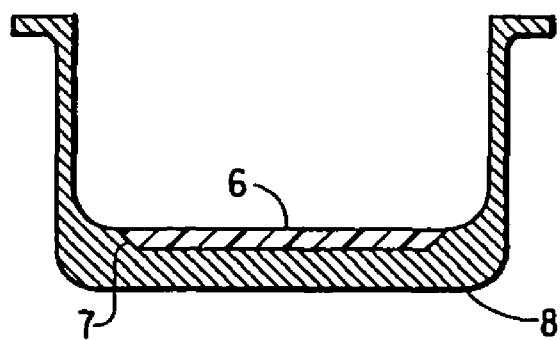

FIG. 2 shows a cross section of a pan similar to that in FIG. 1, except insert 6 has an edge 7 which is "reverse beveled", allowing 6 to be removed from the body 8 for easy cleaning of 6 and/or 8, and/or easy replacement of 6 and/or 8.

Figure 3A:
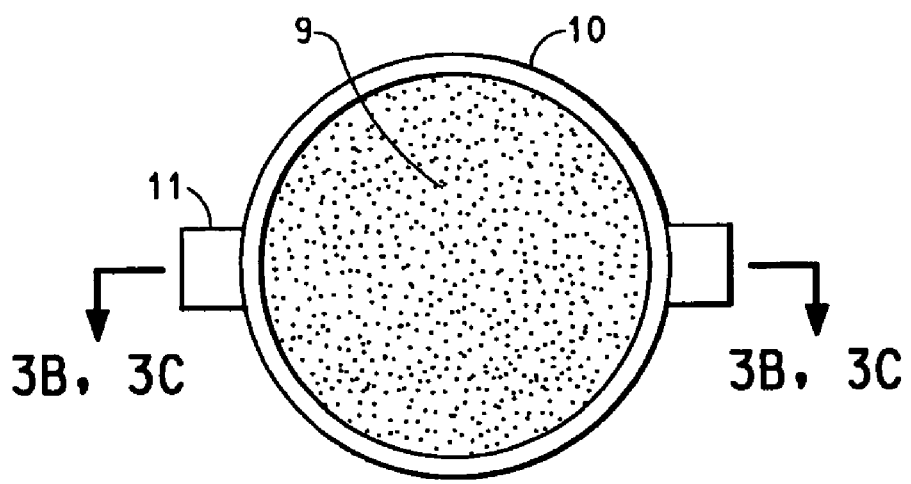
Figure 3B:
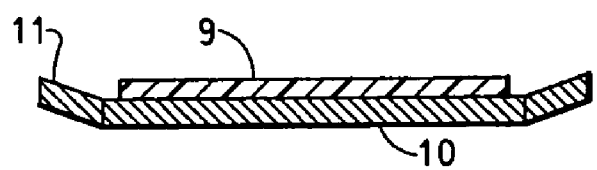
Figure 3C:
Figure 4A:
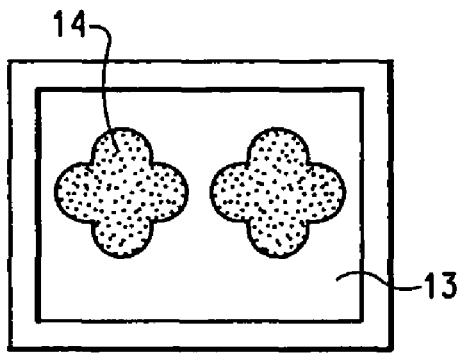
Figure 4B:
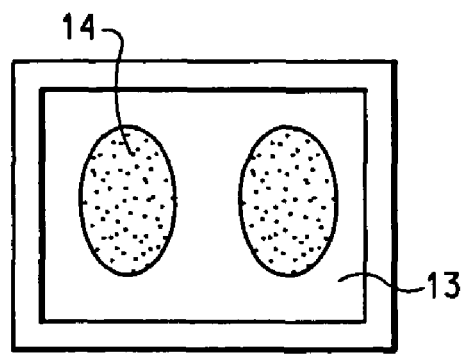
Figure 4C:
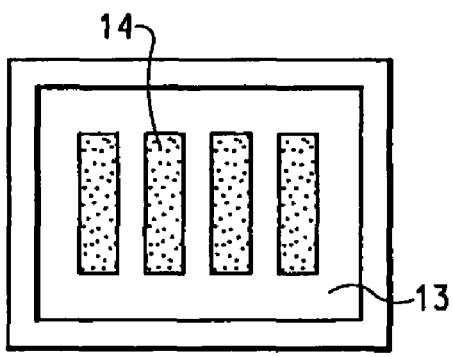
Figure 4D:
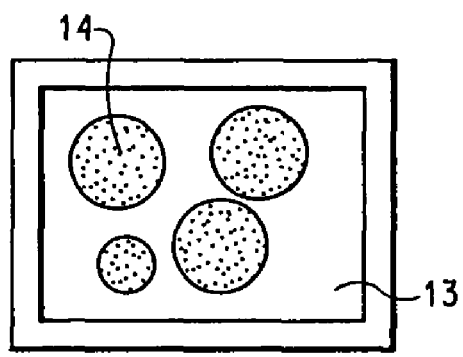

FIG. 3 shows a top view (FIG. 3*a*) and a cross section (FIG. 3*b*) of a "pizza stone" in which an insert 9 merely rests upon the base 10 that has handles 11. The base may optionally have molded in feet (not shown) to hold the stone above the bottom of the microwave oven as is also optional in the pan. The base 10 may have a slight recess slightly larger than the diameter of 9 so 9 does not readily slide off 10 if the pizza stone is tilted during transport (to the table). FIG. 3*c* shows an alternate construction of 9 that has raised edges 12. These raised edges may prevent the pizza from slipping off 9, and/or aid in browning the edges of the pizza (not shown).

FIG. 4 shows top views of several rectangular pans 13, with each pan having two or more inserts 14 present in various patterns. These inserts may be overmolded much like the inserts of the pan of FIG. 1, and each of 14 may have beveled edges similar to 4.

Figure 5:
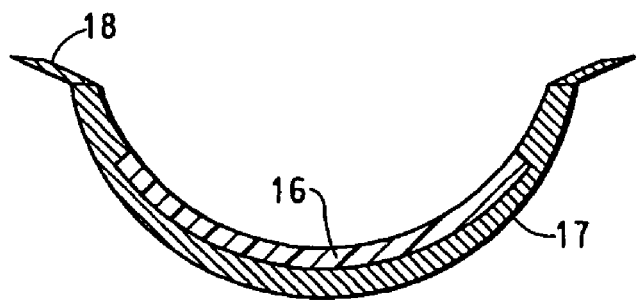

FIG. 5 shows a cross section of a microwave wok, with the insert 16 being at the bottom of the generally spherical wok (the thermal heat source for a wok is usually underneath the wok) being overmolded with a body 17 that has handles 18.

Figure 6A:
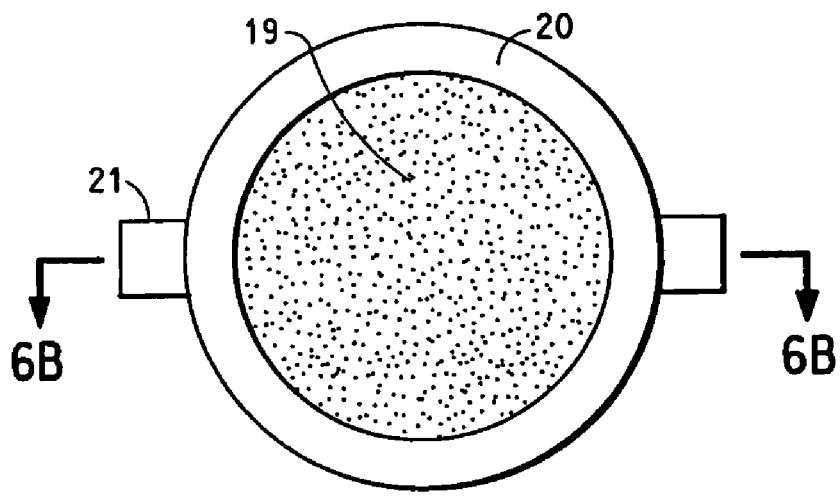
Figure 6B:
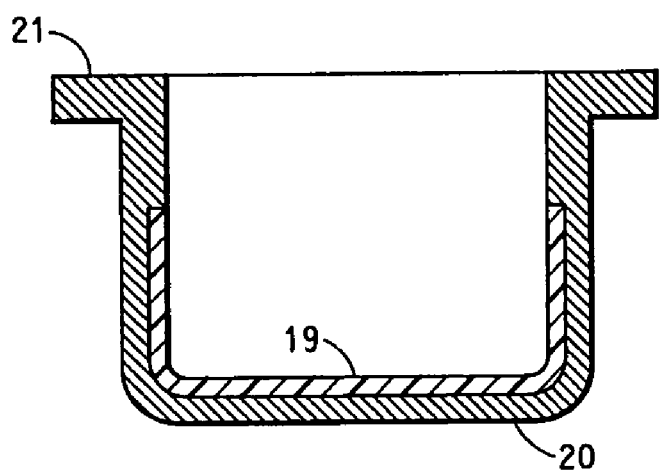

FIG. 6 shows a top view (FIG. 6a) and a cross section (FIG. 6b) of a cylindrical piece of ovenware having an insert 19 inside a body 20 that has handles 21. The insert may cover the entire bottom and most of the interior sides as shown in FIG. 6, or may just cover part of the interior bottom and/or sides (not shown). By using the microwave oven at a low power level this type of ovenware may simulate a so-called slow cooker or crock cooker, which not only heats the food being cooked but also tends to brown the food in contact with the cooking vessel sides and/or bottom.

Figure 7:
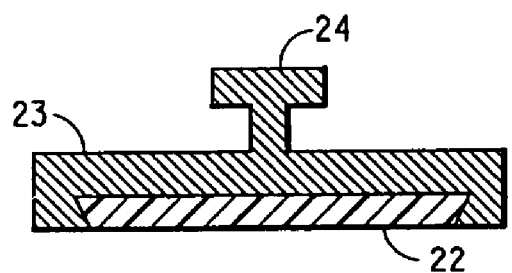
FIG. 7 illustrates an ovenware top of similar construction.

The ovenware item (such as those in FIGS. 1-6) may also have a top (see FIG. 7) which fits on top of the ovenware item or directly on top of the food in the ovenware item. This top may simply be used to close off the top of the ovenware item, much as a top is used on a conventional metal pot. However the top, particularly when in direct contact with the food, may also be the composition as described herein containing a susceptor and having a certain minimum thermal conductivity. The susceptor-containing composition may be present in the top as an insert, analogous to the inserts shown in FIGS. 1-6. In some instances only the top may contain the susceptor-containing material, particularly when the object is to brown the top of the food item being cooked. In that instance the ovenware item may be an ordinary ovenware item as is used today. FIG. 7 shows such a top with the susceptor-containing composition present as insert 22 overmolded with 23, another composition which does not contain a susceptor, the overmolding composition having handle 24. In some instances it may be preferable that 25 be smaller than the container holding the food (not shown), so that the top directly contacts the top of the food (not shown). Tops containing the susceptor-containing compositions described herein are also considered pieces of ovenware herein.

In another type of ovenware, especially for commercial applications, the susceptor-containing material may be a conveyor belt, especially the surface of the conveyor belt which contacts the food resting upon the conveyor belt. This would therefore be a mechanism for browning the surface of the food that was in contact with the surface of the conveyor belt.

In some instances it may be preferable that the surface of the food being cooked and/or heated in contact with the susceptor containing polymer be crisp when the cooking/heating is completed. For instance pizza crusts and many baked goods often preferably have a crispy surface. If the surface of the susceptor containing polymer in contact with the food is smooth, water vapor formed during the cooking/heating process may not be readily able to escape, thereby resulting in a soft (mushy/soggy) textured food surface. It has been found that if the surface contains "water vapor escape channels" the surface of the food is often much crispier. By these channels is meant grooves, surface irregularities, knurled pattern channels, holes or other "channels" through which the water vapor formed in the cooking/heating process may escape from between the food's surface and the susceptor containing polymer's surface. Such channels may be formed by convention means, for examples they may be machined or embossed into the surface of the susceptor containing polymer, but it is preferred that these channels be formed during the molding process for insert or other surface of the susceptor in contact with the food surface.

A preferred type of food using the cookware described herein and/or in the cooking processes described herein is pizza.

The manufacture of the above cookware items can be carried out by conventional melt forming techniques, for example injection molding. When an insert is "locked into" the ovenware item, for instance as in FIG. 1, the insert may be overmolded by a polymeric composition that does not contain a susceptor. In this type of situation it is preferred that the TP or TSP of the insert and of the overmolding composition have the same or nearly the same composition (the polymer itself, not the fillers and other materials, if any mixed with the polymer). This helps to avoid differential shrinkage and subsequent cracking and/or loosening of the insert. If LCPs are used for both parts, it is preferred that the overall orientation in these parts from the molding operation be in the same direction in the final ovenware item. If the melting points or glass transition points of polymers of the insert and overmolding composition are the same or similar, one must be cautious not to significantly melt or otherwise deform the insert during the overmolding operation.

All of the polymeric compositions described herein may contain other ingredients typically added to thermo-plastics (or thermosets), such as fillers, reinforcing agents, plasticizers, flame retardants, pigments, antioxidants, antiozonants, and lubricants, in the amounts usually used for such compositions. These additives may somewhat affect the thermal conductivity, and any thermal conductivity limitations must still be met.

The ovenware items may be coated fully or partially (including coating of compositions containing a susceptor) with various types of release coatings which prevent the food being cooked from sticking to the ovenware and/or allowing easier cleaning of the ovenware. For example various types of fluoropolymer-containing coatings may be used, such as those available under the Teflon® and Silverstone® brand names.

For the susceptor-containing compositions (such as the inserts in FIGS. 1-6) to have a desirable level of durability in a reusable piece of ovenware, it should preferably be at least about 0.25 mm thick, more preferably at least about 0.50 mm thick.

The ovenware items described herein are especially useful in microwave ovens wherein the usual mode of cooking (cooking herein includes both initial cooking and simple (re)heating of food and drink) is absorption of MR by the food or drink being cooked or heated. Most microwave ovens use just MR to provide thermal energy, but some also have a convection (thermal) heating source. The ovenware described herein may be used in both of these types of microwave ovens. The ovenware items may also be used in "ordinary" convection ovens since these items also have good thermal resistance.

When cooking in a convection oven or a microwave oven one wants to balance the overall thermal history of the mass of food with the amount of browning that takes place, usually on one or more surfaces. For example in a convection oven if the temperature of the oven is too high the outside surface of the food item may brown too much, i.e. be burned, before the interior of the item is fully cooked. Thus a loaf of bread could be burned on the outside before the interior of the loaf is fully baked. In order to control such factors in a convection oven, through experience and experimentation cooks have learned to adjust food recipes, the cooking temperature, the cooking container (material), and the shape and mass of the food being cooked to control the relative amounts of cooking vs. browning. Similar considerations come into play in cooking in a microwave oven with the present ovenware. To some extent one should preferably balance the amount of MR which is directly absorbed by the food being cooked with the amount of MR which is being absorbed by the susceptor and converted to heat. This heat from the susceptor is conducted by the relatively high heat conduction composition to the surface of the food being cooked, where the heat is transferred to the food's surface. The relative amounts of MR absorbed directly by the food and the susceptor are influenced by the relative masses, shapes and configurations of the susceptor and the food, as well as the pattern of MR in the oven. In turn the mass, shape and configuration of the susceptor is determined by concentration of the susceptor in the susceptor-containing composition, the volume and especially the thickness of this composition, the thermal conductivity of the susceptor-containing composition, and the relative position of this composition versus the position of the food in the oven. Another variable that can affect the amount of browning vs. the degree of cooking is the recipe for the food itself. Some experimentation may be needed, but this is a normal process when designing new cooking containers and/or recipes for foods.

In order to obtain the desired balance of properties, particularly MR absorption efficiency and thermal conductivity, in the susceptor-containing compositions, one can use separate materials to act as a susceptor and as a thermally conductive filler, and balance each property separately (the presence of these two materials will affect the performance of the other somewhat because each occupies a volume percentage of the composition), or it may be possible to use a single material which is a susceptor and is highly thermally conductive, or any combination of these.

In the Examples the LCP used was the same composition as LCP-4 of U.S. Pat. 5,110,896, which is hereby included by reference. This LCP had the composition (in molar parts) of 50/50/70/30/320 hydroquinone/4,4'-biphenol/terephthalic acid/2,6-napthalene dicarboxylic acid/4-hydroxybenzoic acid. The carbon fiber (CF) used was Panex® 33CF carbon fiber (available from Zoltek Corp.), the glass fiber used (GF) was Owens Corning grade 408 (Owens Corning Fiberglass, Toledo, Ohio, USA), and the other carbon fiber used, CF300 is a pitch carbon fiber available from Conoco, Inc., Houston, Tex., USA. All polymer composition percentages are percent by weight.

Tensile strength and elongation were measured by ASTM Method D638. Flexural modulus and strength were measured by ASTM Method D790 and thermal conductivity (through the plane of the test piece) was measured by ASTM Method D5930.

EXAMPLES 1-4

The LCP samples were made by melt mixing the ingredients shown in Table 1 (amounts shown are percentages by weight of the total composition) in a 30 mm Werner & Pfleiderer twin screw extruder, with the barrel set at 340-350° C. The extruded strands were cooled and chopped into pellets. The pellets were injection molded into plaques and test pieces, and the testing results are shown in Table 1.

TABLE 1

| Ex. | % LCP | % CF300 | % Glass | % CF | Thermal Conductivity W/m° K | Tensile Strength (MPa) | % Tensile Elong. | Flex Modulus (GPa) | Flex Strength (MPa) |
|-----|-------|---------|---------|------|-----------------------------|------------------------|------------------|--------------------|---------------------|
| 1   | 40    | 60      | 0       | 0    | 2.65                        | 45.7                   | 0.76             | 9.31               | 11.5                |
| 2   | 35    | 55      | 0       | 10   | 3.17                        | 47.8                   | 0.47             | 14.5               | 12.2                |
| 3   | 35    | 55      | 10      | 0    | 3.27                        | 56.8                   | 0.67             | 13.8               | 13.4                |
| 4[a]| 31    | 51      | 9       | 0    | 3.6                         | 53.6                   | 0.51             | 14.6               | 12.6                |

[a]Also contains 9 weight percent CF300 ground to a fine powder.

EXAMPLE 5

The composition of Example 4 was injection molded into a circular disk, with dimensions 0.32 cm thickness and 5.1 cm diameter, was placed into a General Electric microwave oven along with a glass containing 240 mL of water. The microwave oven was model number JVM1440AA 001 with a power rating of 1.58 kW. The microwave was run at the highest power setting for 2 minutes. At end of that time, the glass of water was removed and the water was tested by touch for temperature. The temperature was well above body temperature, but not too hot to keep a finger immersed. Then, the disk was tested for temperature and was too hot to the touch to hold.

EXAMPLE 6

A masterbatch containing 35% LCP, 55% CF300, and 10% fiberglass was made by a method similar to that described for Examples 1-4, with a nominal feed rate of 13.6 kg/h (total), a screw speed of 300 rpm, and barrel temperature set points of 350° C. The extruded strands were cooled and chopped into pellets. These pellets were "diluted" with pellets of pure LCP in a pellet blend, so that the pellet blend contained 70% LCP, 25% CF300, and 5% fiberglass. This pellet blend was then injection molded (using a back pressure of 1.0 MPa to ensure good mixing of the two types of pellets in the pellet blend) with a rear zone temperature of 337°, and center and front zone temperatures of 340° C., and a screw speed of 117 rpm, to produce disks 0.32 cm thick and 10.2 cm in diameter.

EXAMPLE 7

Commercially available frozen thin crust pizza was bought at a food market and cut into slices. The pizza was put on top of the disks of Example 6 and placed in a Panasonic Model NN-6470A microwave oven, equipped with a turntable, and having a power rating (input) of 1.54 kW. The oven was turned on (at full power) for 1.5-25. minutes, resulting in cooking the pizza and browning the bottom (crust) pizza surface. However when using a disc with a smooth surface the bottom crust generally tended to be less browned. When discs having water vapor escape channels were used (for instance drilled holes or machined "V" grooves) the bottom crust surface of the pizza was generally more browned.

What is claimed is:

1. An article, comprising, a piece of ovenware suitable for heating and/or cooking food or drink, comprising, a composition which comprises: a mixture of;
   (a) a thermoplastic polymer whose melting point and/or glass transition point is about 250° C. or more, or a thermoset polymer whose softening point is about 250° C. or more; and
   (b) a heating effective amount of a microwave susceptor; and
   provided that said composition has a thermal conductivity of about 0.70 W/m° K or more when measured through a plane of said composition; and further comprising water vapor escape channels.

2. A piece of ovenware, comprising a composition which comprises:

a mixture of;
(a) a thermoplastic polymer whose melting point and/or glass transition point is about 250° C. or more, or a thermoset polymer whose softening point is about 250° C. or more; and
(b) a heating effective amount of a microwave susceptor; and wherein at least part of said composition is in the form of an insert.

3. The ovenware as recited in claim 2 wherein at least a portion of said composition in said ovenware has a thickness of about 100 μm or more.

4. The ovenware as recited in claim 2 also comprising a top which comprises said composition.

5. The ovenware as recited in claim 2 which is a top.

6. The ovenware as recited in claim 2 wherein said thermoplastic polymer is present and is a liquid crystalline polymer.

7. The ovenware as recited in claim 2 wherein said insert further comprises water vapor escape channels.

8. The ovenware as recited in claim 2 wherein said microwave susceptor comprises graphite.

9. The ovenware as recited in claim 2 additionally comprising a filler which is not a susceptor and having a thermal conductivity of about 20 W/m° K or more.

10. A process for cooking in a microwave oven, comprising, contacting food or drink to be cooked and/or heated with a composition which comprises:
a mixture of;
(a) a thermoplastic polymer whose melting point and/or glass transition point is about 250° C. or more, or a thermoset polymer whose softening point is about 250° C. or more; and
(b) a heating effective amount of a microwave susceptor; and provided that said composition has a thermal conductivity of about 0.70 W/m°K or more when measured through a plane of said composition; and exposing said food or drink in contact with said composition to microwave radiation.

11. The process as recited in claim 10 wherein at least a portion of said composition in said ovenware has a thickness of about 100 μm or more.

12. The process as recited in claim 10 wherein said thermoplastic polymer is used.

13. The process as recited in claim 12 wherein said thermoplastic polymer is a liquid crystalline polymer.

14. The process as recited in claim 12 wherein said composition additionally comprises a filler which is not a susceptor and having a thermal conductivity of about 20 W/m° K or more.

15. The process as recited in claim 10 wherein said thermal conductivity is about 2.0 W/m° K or more.

16. The process as recited in claim 15 additionally comprising a filler which is not a susceptor and having a thermal conductivity of about 20 W/m° K or more.

17. The process as recited in claim 10 wherein cookware comprising said composition has water vapor escape channels.

18. The process as recited in claim 10 wherein said microwave susceptor comprises graphite.

19. The process as recited in claim 10 wherein cookware comprising said composition is reused in said process.

20. The process as recited in claim 10 wherein a pizza is cooked and/or heated during said process.

21. The process as recited in claim 10 wherein said composition additionally comprises a filler which is not a susceptor and having a thermal conductivity of about 20 W/m° K or more.

* * * * *